(No Model.) 4 Sheets—Sheet 1.
A. JOHNSON.
CAN TESTING MACHINE.
No. 598,519. Patented Feb. 8, 1898.
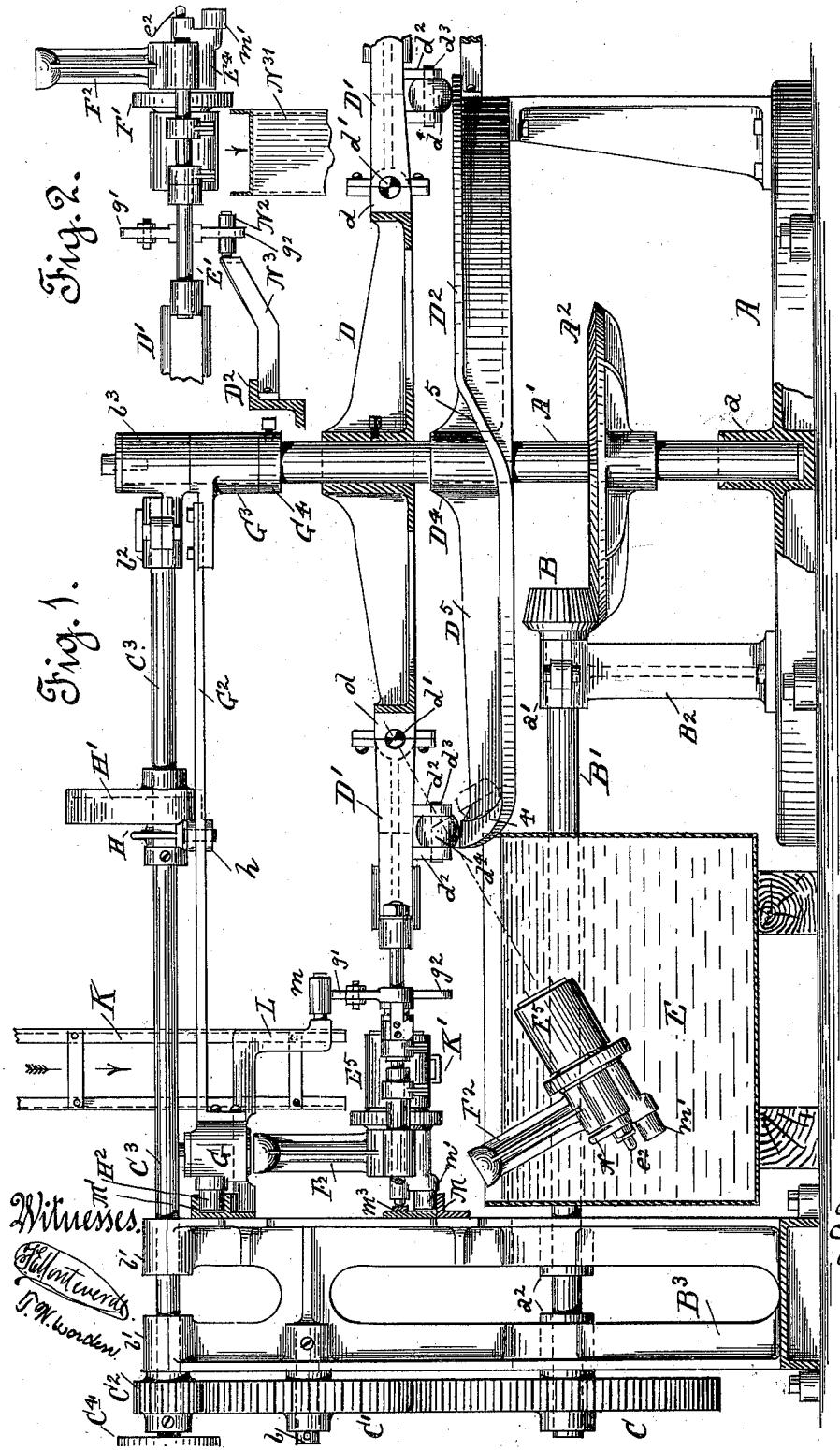

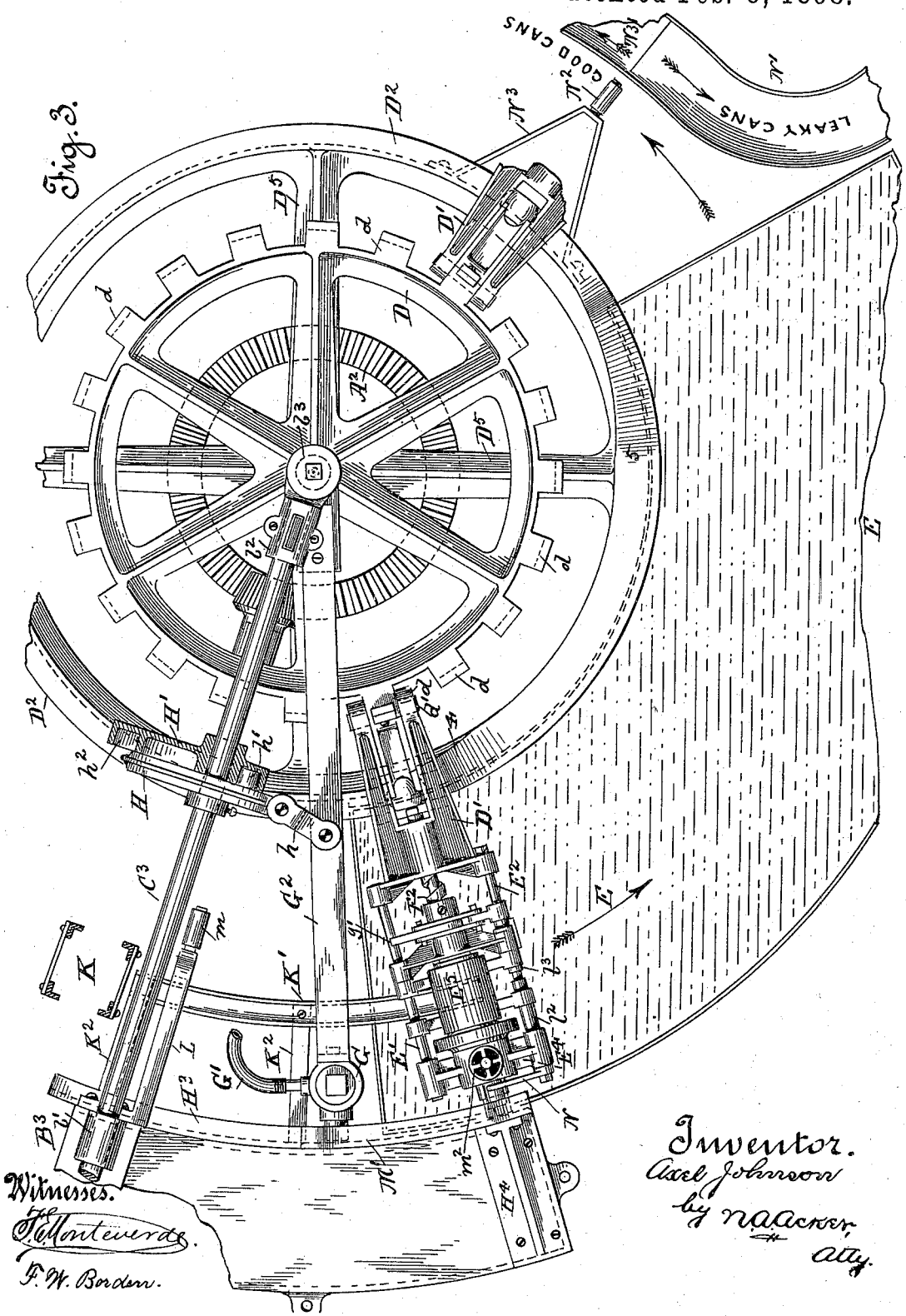

(No Model.)  A. JOHNSON.  4 Sheets—Sheet 3.
CAN TESTING MACHINE.
No. 598,519.  Patented Feb. 8, 1898.
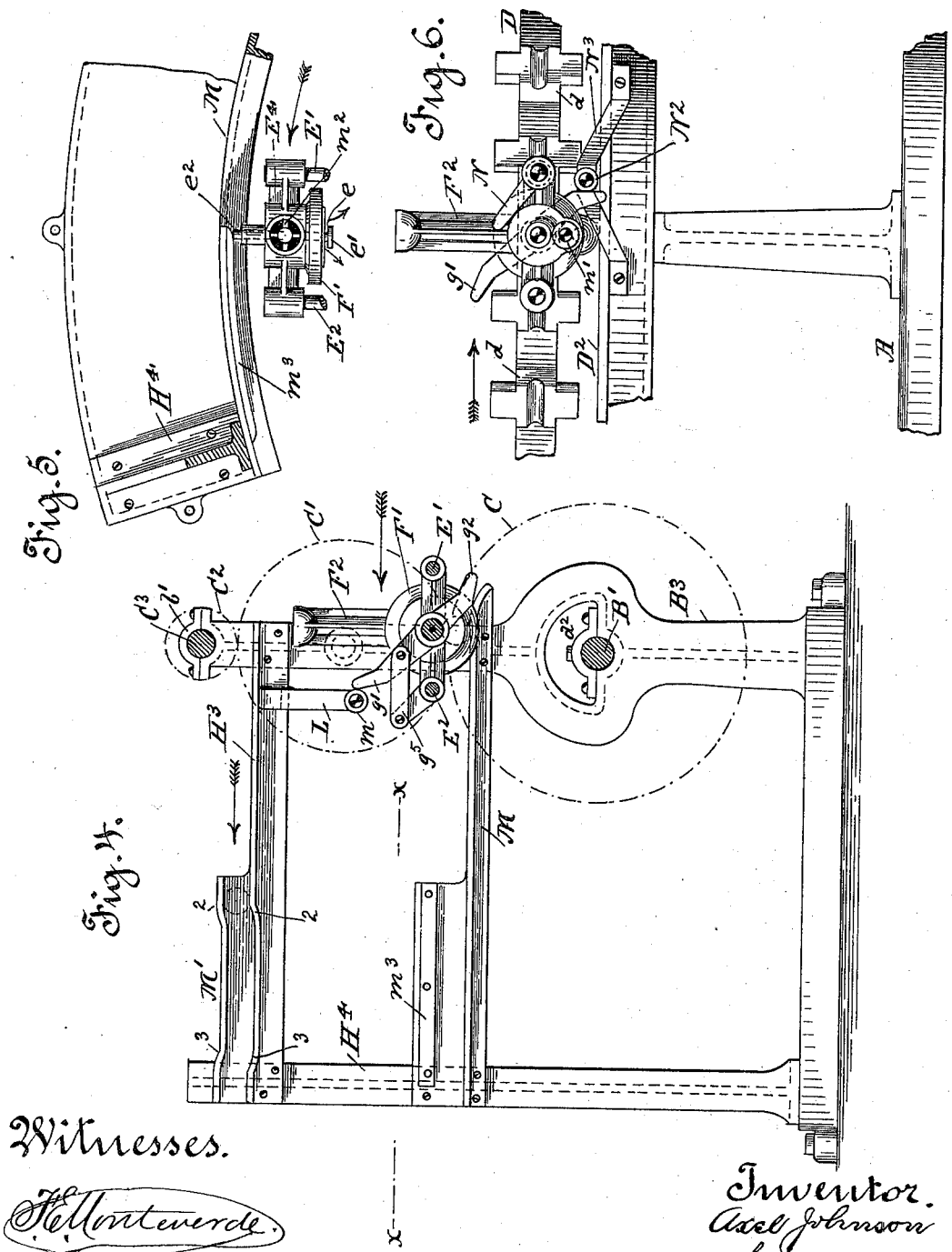

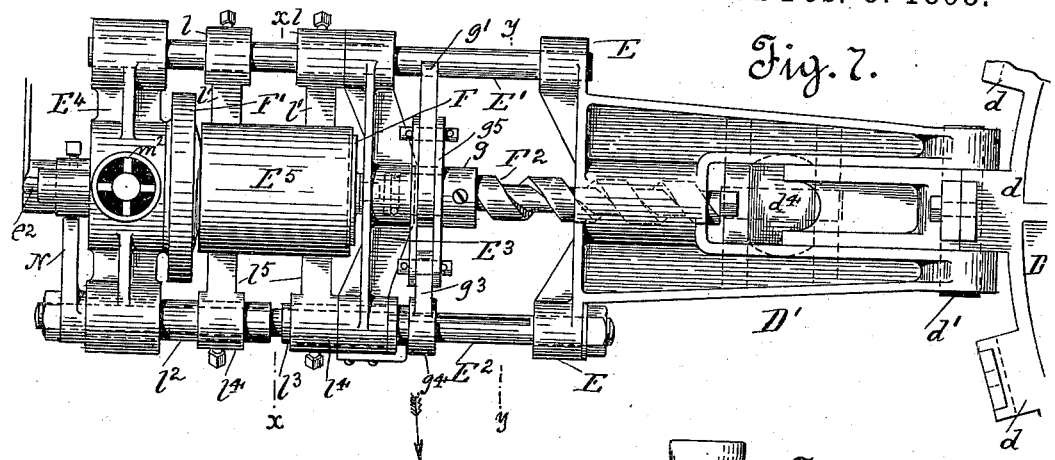

UNITED STATES PATENT OFFICE.

AXEL JOHNSON, OF OAKLAND, CALIFORNIA.

CAN-TESTING MACHINE.

SPECIFICATION forming part of Letters Patent No. 598,519, dated February 8, 1898.

Application filed March 9, 1897. Serial No. 626,593. (No model.)

*To all whom it may concern:*

Be it known that I, AXEL JOHNSON, a citizen of the United States, residing at Oakland, in the county of Alameda and State of California, have invented certain new and useful Improvements in Can-Testing Machines; and I do hereby declare that the following is a full, clear, and exact description thereof.

The present invention relates to certain new and useful improvements in can or other vessel testing machines, and more especially to that class known as "rotary or dip testers," wherein the cans or clamped vessels as carried around by a rotary traveling table are dipped or submerged within a liquid-bath; and it consists in the arrangement of parts and details of construction, as will be hereinafter fully set forth in the drawings and described and pointed out in the specification.

In this class of machinery it is generally the practice to mount the rotatable table or frame carrying the can or vessel clamping mechanism upon a central shaft which carries an air-reservoir or which by being made hollow constitutes the air-reservoir and to connect each of the can or vessel clamping mechanisms with the central air-reservoir by means of a series of flexible air-supply pipes. This manner of forming connection between the air-reservoir and the clamping mechanism is not only very expensive by reason of the pipe connections, but also in repairs which this form of connection constantly requires.

The object of my invention is to dispense with the central air-supply reservoir and the numerous connections required between said reservoir and the clamping mechanisms and to provide a machine wherein the air may be supplied to each clamping mechanism by what I term a common "filling device," which connects with each can or vessel clamping mechanism and moves therewith during a portion of its rotary travel, and while connected thereto fills the clamped can or vessel with air, after which it is disconnected and returns to its point of connection, so as to be in position to engage with the following can-clamping mechanism.

In order fully to understand my invention, reference must be had to the accompanying sheet of drawings, wherein—

Figure 1 is a view in elevation, partly in section, of the apparatus, showing the position of one of the can-clamping mechanisms with a can or vessel clamped and connected with the air-filling device and the position thereof when submerged within the tester-tank, the discharge runway or chute for the tested cans being broken away. Fig. 2 is a broken detail view, in side elevation, showing the discharge chute or runway for the tested cans, the position of the can or vessel clamping mechanism as raised from within the tester-bath, and the roll against which the cam strikes to release the clamping mechanism. Fig. 3 is a broken top plan view of the tester. Fig. 4 is a side view in elevation, viewed from the inside of the machine, showing the side standards, the track and cam-plates located therebetween, and the position of the clamping mechanism as about to close, so as to clamp a can or vessel between the clamp-heads. Fig. 5 is a broken top plan sectional view on line $x$ $x$, Fig. 4, showing the valve-stem of the fixed clamp-head riding upon the cam-plate and the air-inlet valve forced outward to permit the escape of the air-box into the clamped can or vessel. Fig. 6 is an enlarged front view in elevation, showing the position of the clamping mechanism after leaving the tester-tank and prior to being opened to permit the discharge of the tested can or vessel. Fig. 7 is a top plan view of the clamping mechanism and the swinging frame, a portion of the rotatable spider-frame to which the swinging frame is hinged being shown. Fig. 8 is an enlarged side view in elevation, showing the position of the clamping mechanism before being closed, as illustrated in Fig. 1, the fixed clamp-head being in section. Fig. 9 is a cross-sectional end view in elevation, taken on line $x$ $x$, Fig. 7; and Fig. 10 is a sectional view showing an enlarged diagrammatic detail view of the clamp-lever, taken on line $y$ $y$, Fig. 7.

In the drawings the letter A is used to indicate any suitable base for the machine, in the central hub or bearing $a$ of which is fitted the lower end of the central vertical shaft A'. Upon this central shaft is keyed or otherwise secured a short distance above the base the crown gear-wheel $A^2$, with which meshes the crown-pinion B, secured to the inner end of the cross-shaft B'. This shaft works in bearings $a'$ and $a^2$ of the standards $B^2$ and $B^3$, Fig. 1, and to the outer end thereof is secured the gear C, which receives its motion from the intermeshing gear C', secured upon the short arm $b$, projecting from the standard $B^3$, said gear being driven by means of the pinion $C^2$, mounted upon the drive-shaft $C^3$ near its outer end. The drive-shaft at its outer end portion works in bearings $b'$ at the top of the standard $B^3$ and in bearing $b^2$, projecting from the sleeve $b^3$, loosely mounted upon the upper end of the central shaft A', said drive-shaft being driven by means of a belt (not shown) working over the belt-wheel $C^4$, secured upon the outer end of the drive-shaft.

Upon the central shaft is rigidly secured in any suitable manner, so as to rotate therewith, the spider-frame D, which is cast with a series of outwardly-projecting bosses $d$, placed an equidistance apart. To these bosses are hinged or fulcrumed by means of the pins or bolts $d'$ the swinging frames D', which frames carry the can or vessel clamping mechanism. Each swinging frame is provided with the depending ears $d^2$, between which is secured by pin $d^3$ the roll $d^4$. These rolls as the rotatable spider-frame D is carried around travel upon the circular cam-plate or track $D^2$, which cam-plate or track is connected to the central hub $D^4$, through which the central shaft A' extends, by means of the arms $D^5$. This cam-plate or track is located between the crown-gear $A^2$ and the frame D, Fig. 1, and the upper face thereof, except the downwardly-inclined portion thereof, is slightly above the upper edge of the tester-tank E, which contains the liquid-bath, into which the air-filled can or vessel to be tested is submerged.

In the present apparatus a number of can-clamping devices are employed, each being the counterpart of the other. Consequently the description of one will suffice for the others.

Each hinged or swinging frame D' is formed at its outer end with the ears E, through which extend the rods E' $E^2$. Upon these rods I mount the inner and outer cross-heads $E^3 E^4$, which carry the clamp-heads F F'. The inner cross-head is movable longitudinally and is connected to the swinging frame D' by means of a worm-screw $F^2$, said worm-screw being connected to the cross-head $E^3$ by a swivel-joint, while the free end works through a screw-opening formed in the swinging frame, Fig. 7. Being thus connected, it is obvious that as the screw-worm is thrown to the right or to the left the cross-head $E^3$ is moved inward or outward. The distance between the cross-heads is such that as the cross-head $E^3$ is moved outward or inward the can or vessel $E^5$ is clamped or released from between the clamp-heads F F'. The clamp-head F', which engages the open end of the can, is provided with an elastic packing-ring or cushion $F^2$, so as to make an air-tight connection between the said clamp-head and the open end of the vessel.

The cross-head $E^4$ is provided with a short upwardly-extending hollow arm $F^2$, which at its lower end communicates with an air-chamber $F^3$, formed in said cross-head. The air flowing into this air-chamber under pressure through the hollow arm $F^2$, as hereinafter explained, makes its escape into the can or vessel $E^5$, clamped between the heads F F', through the outlet-port $e$, formed in the clamp-head F'. This outlet-port is controlled by the valve $e'$, the stem $e^2$ of which extends outwardly through the rear wall of the air-chamber, said valve being held firmly upon its seat by the pressure of the spring $e^3$.

Upon the worm-screw is rigidly secured the collar $g$, which is formed with the upper and lower projecting cam-fingers $g'$ $g^2$. The upper cam-finger $g'$ is connected to the short lever $g^3$, projecting from the collar $g^4$, keyed to the rod $E^3$ by means of the link $g^5$. The screw-worm is thrown from the right or left in order to clamp or release the can or vessel through the medium of the cam-fingers and the connecting-link and levers, as hereinafter described.

To one side of the machine, or at any convenient place in the factory, is located the air-reservoir, (not shown,) which is connected to the valved coupling or nozzle G by means of the flexible air-supply pipe G'. The valved coupling or nozzle is secured or attached to the outer end of the reciprocating arm $G^2$, the inner end of said arm being fastened to the sleeve $G^3$, loosely mounted upon the central shaft A', said sleeve being held in place by means of the collar $G^4$, affixed to the shaft A'. The arm $G^2$ is sufficient in length to bring the valved coupling or nozzle G directly in line with the hollow arm $F^2$ of the cross-head $E^4$ of the clamping mechanisms. Reciprocating movement is imparted to the arm $G^2$ from the drive-shaft $C^3$ through the medium of the link-plate H, connected to the said arm by link $h$, and the eccentric H', rigidly secured upon the drive-shaft $C^3$, the roll $h'$ projecting from the link-plate H, working in the groove $h^2$ cut in the eccentric H'. Being thus connected it is obvious that as the eccentric is carried around by the movement of the drive-shaft the arm $G^2$, through its connection therewith, will be thrown forward and backward. The reciprocating arm $G^2$ is supported at its outer end by means of the roll $H^2$, secured upon a stud $h^3$, projecting from the valved coupling or nozzle G, which travels upon the track $H^3$, uniting the standards or uprights $B^3$ and $H^4$, Fig. 4. The coupling or nozzle G is provided with an outlet-port $k$, which is controlled by the valve $k'$, the stem $k^2$ of which comes flush with the lower end of the outlet-port when the valve is closed, and the escape-opening of the coupling or nozzle is surrounded with an elastic packing-ring or cushion $k^3$ in order that an air-tight joint may be made between the valve coupling or nozzle G and the upper end of the hollow arms $F^2$ when the said coupling or nozzle is forced downward upon the upper end of the said hollow arm.

To the rod E' are adjustably secured the collars $l$, which are provided with the short inwardly-extending fingers $l'$, and to the sleeves $l^2$ $l^3$ of the cross-heads $E^3$ and $E^4$ are adjustably secured the collars $l^4$, which are provided with the short inwardly-projecting fingers $l^5$. These fingers are placed such a distance apart as to permit the can or vessel to just pass therebetween, they being placed to such an incline as to serve as centering-fingers to place the ends of the can or vessel in line with the clamping-heads F F'.

The cans or vessels to be tested, as delivered to the clamping mechanism by the feed-chute or runway K, fall upon the trackway K', supported by the bracket $K^2$, between the centering-fingers $l'$ and $l^5$ of one of the clamping mechanisms. As carried toward the tester-tank E by the movement of the rotatable spider-frame D the cam-finger $g'$ strikes against the cam-roll $m$, secured to bracket L, Figs. 1, 3, 4, and 8, and is thrown downward. The downward movement of this cam-finger, through the medium of the collar $g$, unscrews the worm-screw $F^2$ from within the swinging frame D', so as to move the cross-head $E^3$ outward and force the clamp-head F against the end of the can or vessel $E^5$ in order to clamp the same firmly between the heads F and F', the open end of the can or vessel being closed against leakage by means of the elastic packing-ring or cushion secured to the clamp-head F'. The can or vessel being thus clamped, the coupling or nozzle G and the can-clamping mechanism move in unison toward the forward end of the tester-tank, the supporting-roll $H^2$ of the coupling or nozzle riding upon the track $H^3$ and the supporting-roll $m'$, secured upon the stud or pin $m^{12}$, projecting from the cross-head $E^4$, riding upon the track M, fastened to the standard $B^3$ and the standard $H^4$ below the track $H^3$, Fig. 4. The coupling or nozzle and the clamping mechanism are carried forward in this position until the roll $H^2$ rides upon the downwardly-inclined portion 2 of the track $H^3$, being moved downward by the inclined cam-plate M', beneath which it is carried when the coupling or nozzle G is forced downward against the upper end of the hollow arm $F^2$, a close joint being made by the packing $k^3$. During the downward movement of the coupling or nozzle G the valve $k'$ is lifted or unseated by the lower end of the valve-stem $k^2$ bearing upon the cross-ribs $m^2$, secured in the upper end of the hollow arm $F^2$. The moment this valve $k'$ is unseated the air forced into the coupling or nozzle under pressure from the supply-pipe G' flows through the hollow arm $F^2$ into the air-chamber $F^3$, whence it escapes into the clamped can or vessel upon the unseating of the valve $e'$. This valve is forced outward or unseated simultaneously with the valve $k'$, for as the roll $H^2$ moves upon the downwardly-inclined portion 2 of the track $H^3$ the end of the valve-stem $e^2$ rides upon the inclined cam-plate $m^3$ and is forced inward, so as to unseat the valve $e'$. The valves $k'$ and $e'$ remain open until the clamped can or vessel is completely filled with air under pressure, or until the valve $k'$ is closed or seated by the roll $H^2$ riding upon the upwardly-inclined portion 3 of the track $H^3$, which disconnects the coupling or nozzle G' from the upper end of the hollow arm $F^2$, the valve $k'$ being seated as the connection is broken by the pressure of the air within the coupling or nozzle G. As the valve $k'$ is closed by the upward movement of the coupling or nozzle the valve $e'$ is likewise closed to prevent the escape of air from within the clamped can or vessel by the valve-stem $e^2$ moving off the inclined cam-plate $m^3$, the said stem being forced outward by the pressure of the spring $e^3$. The moment the coupling or nozzle is disconnected from the hollow arm it is thrown or drawn backward to be in position to connect with the hollow arm of the next clamping mechanism by means of the arm $G^2$, the movement of which is controlled by the eccentric H', as before explained. The clamping mechanism, with the clamped and air-filled can or vessel, being carried beyond the track M, the roll $d^4$ of the swinging frame D' rides upon the downwardly-inclined portion 4 of the cam-ring $D^2$, in order that the swinging frame may move downward, so as to place the clamped can or vessel within the bath of the tester-tank E.

If the clamped can or vessel carried through the tester-bath is a leaky one, the fact will be indicated by the bubble created as the air escapes from within the clamped can or vessel. The can or vessel is carried submerged within the tester-bath until the roll $d^4$ rides upon the upwardly-inclined portion 5 of the cam-ring $D^2$, which gradually lifts the swinging frame D' and raises the clamping mechanism and tested can or vessel from within the tester-bath. If the can is a leaky one, the operator having charge of the machine as the clamped vessel is lifted from within the tester-bath throws the handle N, secured to the outer end of the rod $E^2$, upwardly, which oscillates the said rod $E^2$ and through its connection with the worm-screw turns the said screw so as to draw the cross-head $E^3$ and the clamp-head F inward in order to release the tested can or vessel and permit the same to fall into the discharge-chute N' for the leaky cans or vessels. If the can or vessel is a perfect or non-leaky one, the operator does not disturb the position of the handle N, when the cam-finger $g^2$ will strike against the cam-roll $N^2$, secured to the bracket $N^3$, projecting from the cam-ring $D^2$, and be thrown downward, which will turn the worm-screw $F^2$, so as to withdraw the cross-head $E^3$ and clamp-head F and permit the released can or vessel to be dropped into the runway $N^{31}$ for the perfect cans.

I am aware that changes may be made in the arrangement of parts and details of construction herein shown and described without creating a departure from the nature and scope of my invention. Consequently I do not wish to be understood as confining myself to the exact construction set forth and described.

So far as I am aware I am the first to provide a machine having a common or central supply or air-filling device or station for the several can-clamping mechanisms. Consequently I wish to be understood as claiming this feature broadly.

Having thus described my invention, what I claim as new, and desire to secure protection in by Letters Patent of the United States, is—

1. In a testing apparatus, the combination with the rotatable table or frame, of a series of swinging frames secured thereto, the clamping mechanisms carried thereby, and of a common air-supply device which connects successively with each clamping mechanism and travels therewith during a portion of its movement so as to supply air to the clamped can or vessel carried thereby.

2. In a testing apparatus, the combination with a series of can or vessel clamping mechanisms, of a tester-bath tank through which the can or vessel clamping mechanisms are carried, a single independently-movable air-supply device common to all and which connects successively with each clamping mechanism and travels therewith during a portion of its movement so as to supply air to the clamped can or vessel carried thereby, and of devices for connecting and disconnecting the air-supply device with the can-clamping mechanisms prior to said mechanisms entering into the tester-bath.

3. In a testing apparatus, the combination with the central rotatable shaft, of the spider-frame secured to and carried thereby, a series of swinging frames hinged thereto, the inclined cam-ring located below the spider-frame, the can-clamping mechanism secured to the swinging frames, the cam devices for opening and closing the clamping mechanism, the reciprocating coupling or nozzle, and of devices for connecting the air-supply coupling or nozzle with one of the can or vessel clamping heads and holding the same connected until the clamped can or vessel is filled with air and then disconnecting the coupling or nozzle, the valve located within the coupling or nozzle, a valve for controlling the flow of air to the clamped can or vessel, and of devices for opening and closing the clamping mechanisms.

4. In a testing apparatus, the combination with the clamping mechanisms for the cans or vessels, of the devices for operating the same to clamp or release the vessels, a reciprocating valved coupling or nozzle which connects successively with each clamping mechanism, and of connection between said coupling or nozzle and a source of air-supply.

5. In a testing apparatus, the combination with the can or vessel clamping mechanisms, of a reciprocating arm, the valved coupling or nozzle, secured to and carried by said arm, which connects successively with each clamping mechanism, of connection between the valved coupling or nozzle and a source of air-supply, and of devices for connecting the said coupling or nozzle with the clamping mechanisms and maintaining the connection until the clamped can or vessel is filled with air and then disconnecting the said coupling or nozzle from the clamping mechanism.

6. In a testing apparatus, the combination with the vessel-clamping mechanisms, of a reciprocating valved coupling or nozzle which engages successively each clamping mechanism, of connection between the coupling or nozzle and a source of air-supply, and of devices for making and breaking connection between the said coupling or nozzle and the clamping mechanisms.

7. In a testing apparatus, the combination with the rotatable spider-frame or table, of a series of swinging frames secured thereto and carried thereby, the can or vessel clamping mechanism secured to the swinging frames, the tester-bath, devices for lowering the clamping mechanism within the tester-bath and raising the same therefrom, and of a reciprocating device for supplying air successively to each vessel carried by the clamping mechanism.

8. In a testing apparatus, the combination with the clamping mechanisms for the cans or vessels to be tested, of a reciprocating air supply or filling device common to and which connects successively with each clamping mechanism, and of mechanism for making and breaking connection between the air-filling device and the different clamping mechanisms.

9. In a testing apparatus, the combination with the longitudinally-movable cross-head, of the clamp-head carried thereby, the fixed cross-head, a clamp-head secured thereto, an air-box formed in said cross-head, a valve-controlled air-outlet opening in said air-box and clamp-head, the hollow arm, communicating with the air-box, upwardly extending from the fixed cross-head, a valved air-filling device common to all and which successively connects with the hollow arm of each clamping mechanism, and of devices for making and breaking connection between the said hollow arm and the valved air-filling device.

10. In a testing apparatus, the combination with the fixed cross-head, of a clamp-head secured thereto, a longitudinally-movable cross-head carrying a clamp-head, a swinging frame which carries the cross-heads, a rotatable table to which the swinging frames are hinged, a worm-screw connection between the swinging frame and the movable cross-head, of devices for turning the worm-screw to move the cross-head toward or from the fixed cross-head so as to clamp or release a can or vessel, of mechanism for supplying air to the clamped can or vessel, a tester-bath into which the clamped vessel is submerged, and of devices for controlling the air-supply mechanism.

11. In a testing apparatus, the combination with a series of can or vessel clamping mechanisms, of a reciprocating valved air-filling device common to all and which successively connects with each clamping mechanism, of devices for connecting the air-filling device with each clamping mechanism, maintaining the connection until the clamped can is filled and then destroying the connection, and of a valve within the clamping mechanism for preventing the escape of air from within the clamped can or vessel after the filling device has been disconnected.

In testimony whereof I affix my signature, in presence of two witnesses, this 3d day of February, 1897.

AXEL JOHNSON.

Witnesses:
N. A. ACKER,
LEE D. CRAIG.